United States Patent
Nakayama et al.

[11] Patent Number: 5,991,259
[45] Date of Patent: Nov. 23, 1999

[54] OPTICAL DISK WITH TRACKING GUIDE OF WIND AND UNWIND PORTIONS

[75] Inventors: Junichiro Nakayama, Shiki-gun; Naoyasu Iketani, Tenri; Michinobu Mieda, Shiki-gun; Yoshiteru Murakami, Nishinomiya; Akira Takahashi, Nara, all of Japan

[73] Assignee: Sharp Kabushiki Kaisha, Osaka, Japan

[21] Appl. No.: 08/886,299

[22] Filed: Jul. 1, 1997

[30] Foreign Application Priority Data

Jul. 5, 1996 [JP] Japan ................................ 8-176199
Oct. 30, 1996 [JP] Japan ................................ 8-287740

[51] Int. Cl.⁶ .................................................. G11B 7/24
[52] U.S. Cl. ............................................... 369/275.4
[58] Field of Search ........................... 369/275.4, 275.2, 369/272, 277, 278, 279; 428/64.4, 64.1; 430/321, 320

[56] References Cited

U.S. PATENT DOCUMENTS

| 4,862,447 | 8/1989 | Opheij . | |
| 5,303,216 | 4/1994 | Shinoda et al. | 369/44.13 |
| 5,463,614 | 10/1995 | Morita | 369/275.4 |
| 5,537,373 | 7/1996 | Horikiri | 369/44.13 |
| 5,539,724 | 7/1996 | Ohtomo | 369/275.4 |
| 5,715,217 | 2/1998 | Fuji | 369/275.4 |
| 5,820,795 | 10/1998 | Takemori et al. | 264/1.36 |
| 5,844,883 | 12/1998 | Kanno et al. | 369/275.4 |

FOREIGN PATENT DOCUMENTS

| 3 153 674 | 1/1982 | Germany . |
| 3 620 301 | 1/1987 | Germany . |
| 5-314538 | 11/1993 | Japan . |

*Primary Examiner*—Tan Dinh
*Attorney, Agent, or Firm*—Dike, Bronstein, Roberts & Cushman, LLP; David G. Conlin; William J. Daley, Jr.

[57] ABSTRACT

An optical disk substrate in which a winding groove, which is winding in accordance with address information, and a normal groove, which is not winding, are placed alternately in the radial direction as tracking guides used for tracking control. With respect to this optical disk substrate, a laser beam, which is used for forming patterns for the tracking guides, is applied while being switched alternately between the first mode that exerts oscillations in the disk radial direction in accordance with the address information and the second mode that does not exert oscillations. An optical disk has a construction in which at least a recording layer is formed on the optical disk substrate.

17 Claims, 15 Drawing Sheets

OPTICAL DISK WITH TRACKING GUIDE OF WIND AND UNWIND PORTIONS

FIELD OF THE INVENTION

The present invention relates to an optical disk substrate having a tracking-use groove or land, and also concerns an optical disk using such a substrate and a manufacturing method thereof.

BACKGROUND OF THE INVENTION

Various methods have been proposed to provide address information in an optical disk substrate and optical disk, and in order to meet demands for high-density recording, a method for allowing a tracking-use groove itself to have address information has been proposed. More specifically, in the method, the tracking-use groove is provided in a winding fashion and the address information is found by extracting a winding frequency component from the tracking signal.

Moreover, as illustrated in FIGS. 23(a) through 23(c), Japanese Laid-Open Patent Publication No. 314538/1993 (Tokukaihei No. 5-314538) discloses a method wherein: in an optical disk substrate, only one of the side walls of a groove is allowed to wind in accordance with address information, and only the one side is subjected to a reading operation by using a recording-reproduction-use light spot 4 whose diameter is smaller than double the groove width, so as to find the address information. FIG. 23(a) is an explanatory drawing that shows a manufacturing method of this optical disk substrate, FIG. 23(b) is an explanatory drawing that shows how to read information from an optical disk using the optical disk substrate of this type, and FIG. 23(c) is a cross-sectional view of FIGS. 23(a) and 23(b).

However, in the optical disk substrate that is shown in FIG. 23, during its manufacturing process, at least two laser light beams 30a and 30b are applied in the radial direction in a spaced relationship with one another, while only one of the laser light beams is oscillated in the radial direction in accordance with the address information during the application. More specifically, the laser light beams 30a and 30b are applied in a manner so as to respectively follow lines 30c and 30d in FIG. 23(a). Since the laser light beam is split into two, the resulting problems are that the efficiency of light utilization is decreased, that a complex optical system is required, and that the respective laser beams have to be controlled individually.

SUMMARY OF THE INVENTION

An objective of the present invention is to achieve an, optical disk substrate with address information recorded therein and an optical disk using such a substrate more easily.

In order to achieve the above objective, the optical disk substrate of the present invention, which is an optical disk substrate having a tracking guide constituted by a groove or a land, is arranged so that: the tracking guide has a portion in which both of the walls are allowed to wind in accordance with address information and a portion in which both of the walls are straight, and the winding portion and the straight portion are alternately placed in the disk radial direction.

With the above-mentioned arrangement, since the winding portion and the straight portion of the tracking guide are alternately placed in the disk radial direction, it is possible to identify a specific track more accurately, for example, by detecting a winding frequency of the winding portion.

In order to achieve the above-mentioned objective, the manufacturing method of an optical disk substrate of the present invention is characterized in that the pattern of the tracking guide consisting of the first portion both walls of which are allowed to wind in accordance with the address information and the second portion both walls of which are straight is formed by applying a laser light beam while making switches between the first mode for oscillating the laser light beam in the disk radial direction in accordance with the address information and the second mode without the oscillation.

With this arrangement, the pattern of the tracking guide consisting of the first portion that is allowed to wind in accordance with the address information and the second portion that is straight is formed by using only one laser light beam; therefore, as compared with the conventional method for applying two laser light beams with a spaced relationship with each other, the control of laser beam is carried out more easily, the efficiency of utilization of laser beam is improved, and the construction of an optical system for generating a laser light beam is more simplified. These advantages contribute to lower costs of the optical disk substrate.

Moreover, when an optical disk is made by forming at least a recording layer on the optical disk substrate, it is possible to provide optical disks more inexpensively.

Furthermore, by additionally providing pits, raised portions, portions having varied curvatures, a region in which all the adjacent tracking guides in the disk radial direction are winding within a predetermined length, or other portions, judgement can be made as to which track the light beam is scanning during a reproducing operation,, thereby making it possible to obtain further accurate address information.

For a fuller understanding of the nature and advantages of the invention, reference should be made to the ensuing detailed description taken in conjunction with the accompanying drawings.

DESCRIPTION OF THE EMBODIMENTS

[Embodiment 1]

Referring to FIGS. 1 through 4 the following description will discuss one embodiment of an optical disk substrate of the present invention.

Figure 1:
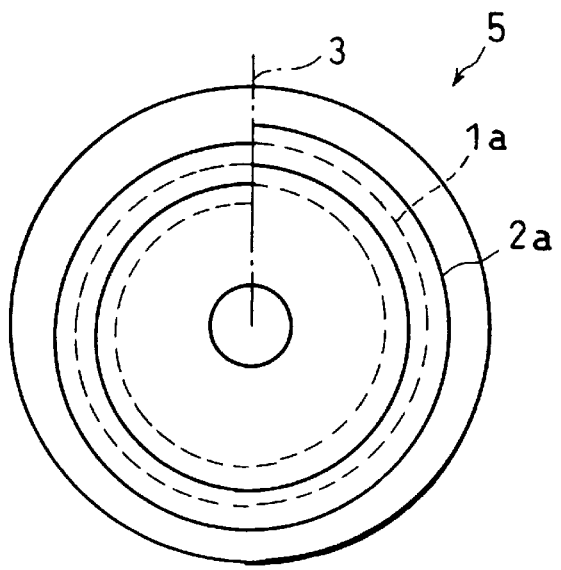
FIG. 1 is a plan view that shows a schematic construction of an optical disk substrate in accordance with one embodiment of the present invention.
Figure 2A:
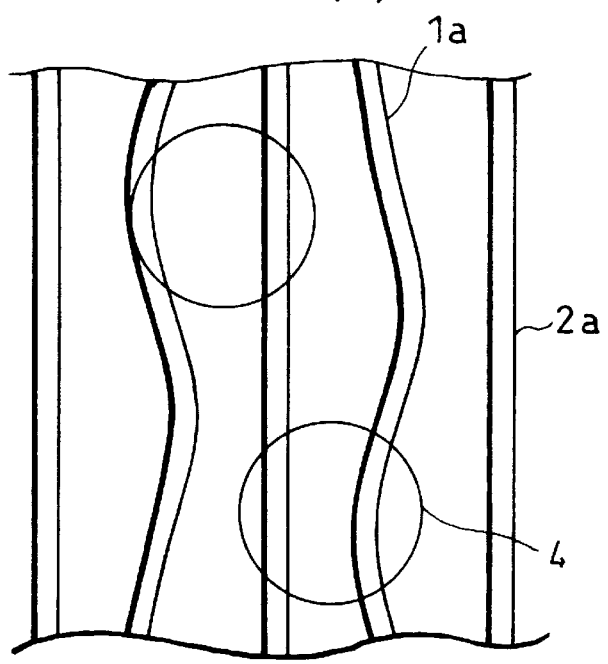
FIG. 2(a) is a plan view that shows one portion of the optical disk substrate in an enlarged manner.
Figure 2B:
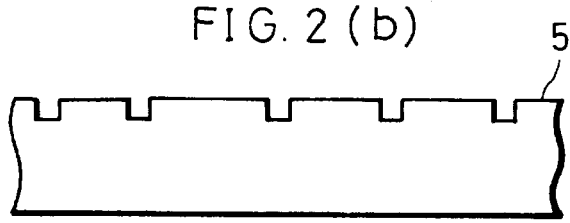
FIG. 2(b) is a cross-sectional view that shows a cross-section taken along the radial of the optical disk substrate.

As illustrated in FIGS. 1 and 2, on the optical disk substrate 5 of the present embodiment, a tracking-use winding groove (indicated by the first portion) 1a, which is winding, and a tracking-use normal groove (indicated by the second portion) 2a, which is not winding, are formed alternately in the disk radial direction. Here, FIG. 1 is a plan view of the optical disk substrate 5, FIG. 2(a) is a plan view that shows one portion of the optical disk substrate 5 in an enlarged manner, and FIG. 2(b) is a cross-sectional view when seen the optical disk substrate 5 is cut along the radius thereof. Further, as illustrated in FIG. 1, the winding groove 1a and the normal groove 2a are placed so that they follow each other alternately at switching sections 3 in the disk circumferential direction. The winding groove 1a and the normal groove 2a are formed into a spiral shape. A region between the winding groove 1a and the normal groove 2a is referred to as a land.

The winding groove 1a is winding in the disk radial direction in accordance with address information, and its winding frequency is set at a value that is higher than a follow-up frequency of the tracking servo system and that is also lower than a recording frequency.

In an optical disk using the optical disk substrate 5 of this type, information is recorded on the land. The tracking signal is obtained by, for example, the push-pull method. The address information is found by extracting components of the winding frequency of the winding groove 1a from the tracking signal.

More specifically, at the time when a recording-reproduction-use light spot 4 is applied so as to follow the land, since the winding frequency is higher than the follow-up frequency of the tracking servo system, the recording-reproduction-use light spot 4 tracks virtually the center line of the average width of the land. For this reason, a tracking error signal that corresponds to the winding amplitude of the winding groove 1a is always generated. Therefore, the signal component of the winding frequency is obtained by extracting the tracking error signal from the tracking signal.

Further, the address information of the winding groove 1a can serve as common address information related to two lands that are adjacent to both sides of the winding groove 1a, and whether the recording-reproduction-use light spot 4 is following the land on the right side or the land on the left side of the winding groove 1a can be judged depending on whether the tracking error signal is being generated on the left area or on the right area of the recording-reproduction-use light spot 4. Thus, since it is possible to easily make a selection as to whether the recording-reproduction-use light spot 4 is following the land on the right side or the land on the left side of the winding groove 1a, a specific track can be easily identified.

In the optical disk device 5 of the present embodiment, the diameter of the recording-reproduction-use light spot 4 is set greater than the track pitch but smaller than double the track pitch; therefore, it is avoidable to direct the recording-reproduction-use light spot 4 onto two winding grooves 1a at the same time, thereby making it possible to obtain accurate address information. Moreover, even if the track pitch is made narrower in order to record information on the optical disk with high density, it is possible to read the address information accurately.

In the above-mentioned explanation, the signal component of the winding frequency is extracted from the tracking signal; yet, the signal component of the winding frequency can be extracted from the change in the amount of light reflected from the optical disk. In other words, by utilizing the fact that the reflected light becomes weaker with a narrowed land and the reflected light becomes stronger with a widened land, the change in the amount of the reflected light is extracted so that the signal component of the winding frequency is obtained.

Next, referring to FIGS. 3(a) through 3(e), the following description will discuss a manufacturing process of the optical disk substrate 5.

Figure 3A:
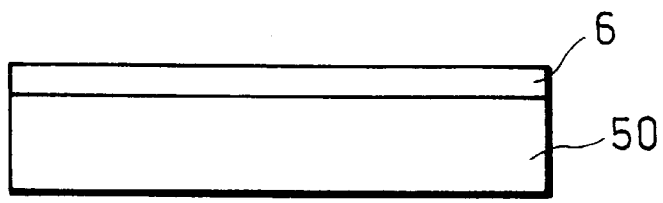
FIGS. 3(a) through 3(e) are explanatory drawings that respectively show main processes of a manufacturing method of the optical disk substrate.

First, as illustrated in FIG. 3(a), photoresist 6 is applied to one side of a glass substrate 50.

Figure 3B:
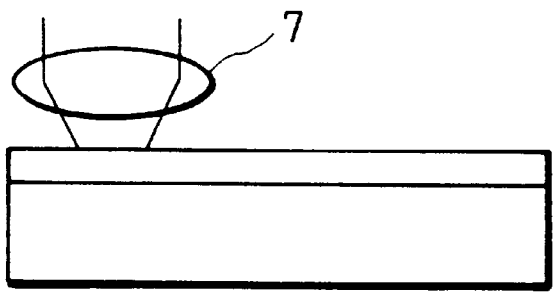

Next, as illustrated in FIG. 3(b), a laser light beam is converged by an objective lens 7 onto the photoresist 6 so that the photoresist 6 is exposed so as to form patterns of desired winding groove 1a and normal groove 1b.

Figure 3C:
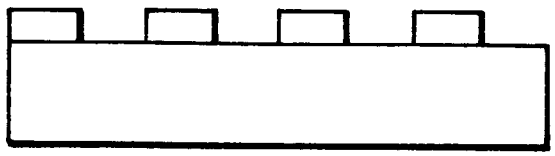

As illustrated in FIG. 3(c), the exposed photoresist 6 is developed and removed, and subsequently, the desired patterns are formed by the residual photoresist 6.

Figure 3D:
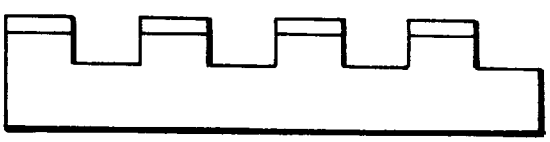

As illustrated in FIG. 3(d), the glass substrate 50 and the photoresist 6 are etched by a dry etching or wet etching process so that the desired patterns are formed in the glass substrate 50.

Figure 3E:
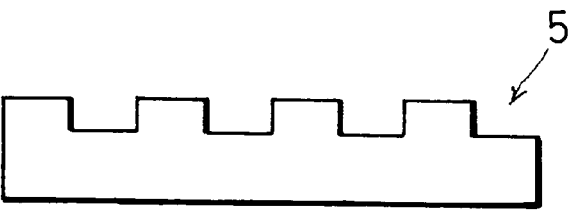

As illustrated in FIG. 3(e), the residual photoresist 6 is removed by an ashing process so that the optical disk substrate 5 is complete.

In order to form the normal groove 2a in a spiral shape, it is only required that an exposing-use light spot is shifted relative to the glass substrate 50 in a spiral shape (the second mode), whereas, in order to form the winding groove 1a, the exposing-use light spot is oscillated in the radial direction in accordance with address information while it is being shifted in a spiral shape (the second mode). Thus, the winding groove 1a having a pattern corresponding to the address information is formed on the photoresist 6.

Figure 4:
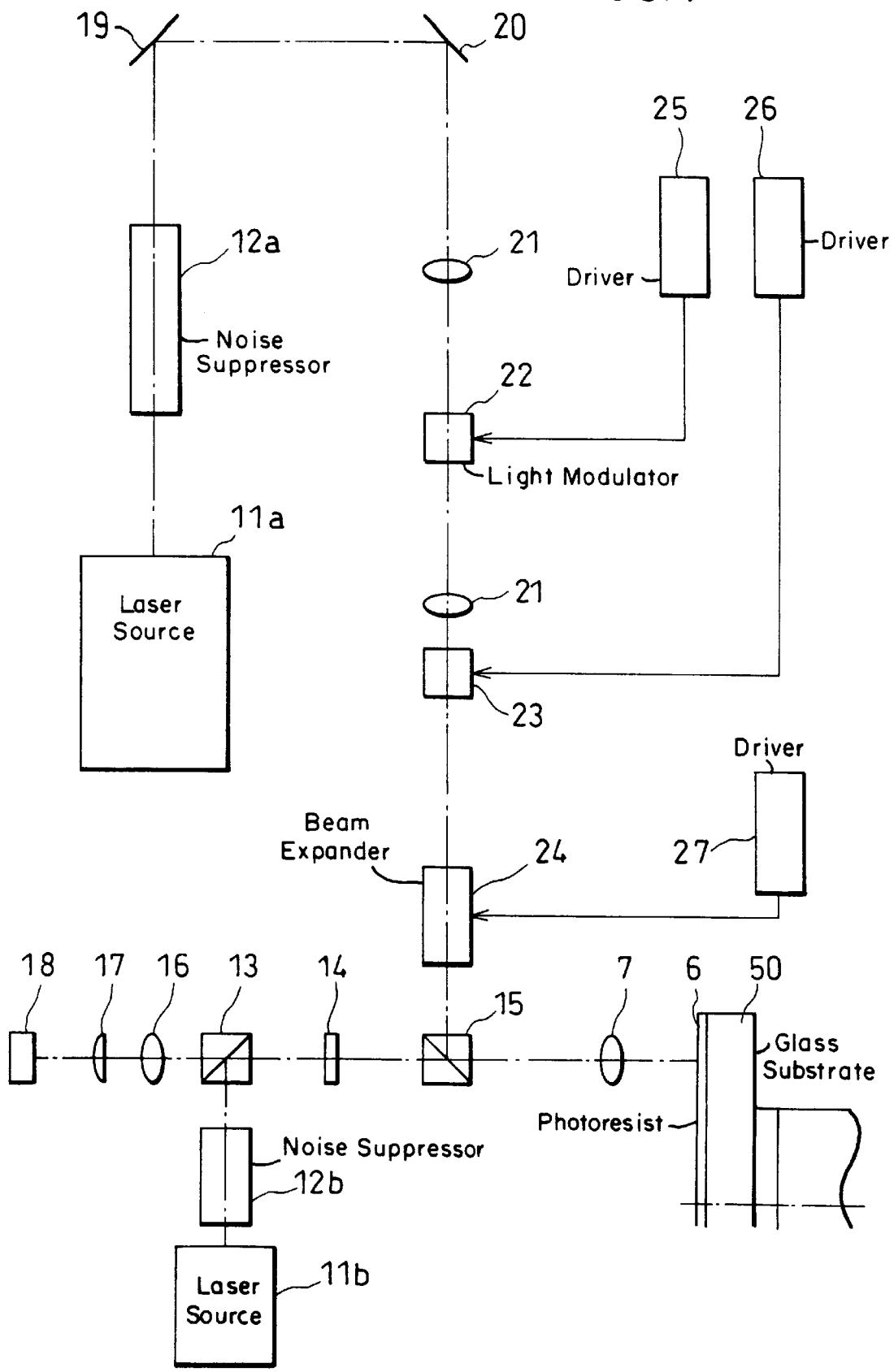
FIG. 4 is a block diagram that shows a schematic construction of a device used for manufacturing the optical disk substrate.

Here, an explanation will be given of a device for exposing the photoresist 6 so as to form the patterns of the winding groove 1a and the normal groove 2a. FIG. 4 is a block diagram showing a schematic construction of the device.

This device is provided with a laser light source 11a for generating a laser light beam for exposing the photoresist 6 and a laser light source 11b used for focusing the objective lens 7. For example, an Ar laser is used as the laser light source 11a and for example, a Ne—He laser is used as the laser light source 11b.

A laser light beam from the laser light source 11a, whose light noise has been reduced by a noise-suppressing device 12a, is reflected by mirrors 19 and 20, and is made incident on a light modulator 22. For example, an acoustic optical element can be used as the light modulator 22, and in this case, converging lenses 21 are placed before and after the light modulator 22.

The laser light beam, which has passed through the light modulator 22, is made incident on a light-deflecting device 23. For example, an electro-optical element or an acoustic optical element is used as the light-deflecting device 23, which changes the proceeding direction of the laser light beam.

Further, the laser light beam is expanded to have an appropriate beam diameter by a beam expander 24, and is made incident on the objective lens 7 by a dichroic mirror 15. Then, the laser light beam is converged by the objective lens 7 onto the photoresist 6 on the glass substrate 50 as an exposing-use light spot.

Here, the light modulator 22, the light deflecting-device 23 and the beam expander 24 are respectively controlled by drivers 25, 26 and 27.

A laser light beam from the laser light source 11b, whose light noise has been reduced by a noise-suppressing device 12b, passes through a polarizing beam splitter 13, a quarter wavelength plate 14 and a dichroic mirror 15, and is converged by the objective lens 7 onto the photoresist 6 on the glass substrate 50.

The reflected light is again converged by the objective lens 7, passes through the dichroic mirror 15, the quarter wavelength plate 14, and the polarizing beam splitter 13, and is converged onto a photodetector 18 by an objective lens 16 and a cylindrical lens 17. Based upon the signal from the photodetector 18, a focus servo system drives the objective lens 7 in a focussing direction so that the objective lens 7 is focussed onto the photoresist 6 on the glass substrate 50 that is rotated by a spindle motor.

In the above-mentioned arrangement, the light deflecting device 23 oscillates the exposing-use light spot in the radial direction in accordance with address information, and the light modulator 22 and the beam expander 24 optimize the intensity of the laser light beam or the laser spot diameter. Further, each time the exposing-use light spot travels on the disk, the driver 26 carries out an ON-OFF switching of the light deflecting device 23 at the switching section 3 shown in FIG. 1; thus, the tracking-use winding groove 1a that is winding and the tracking-use normal groove 2a that is not winding are formed in a manner adjacent to each other in the disk radial direction.

Additionally, the manufacturing method of the optical disk substrate 5 of the present invention is not intended to be limited to the above-mentioned arrangement, and may be manufactured by making a mask original disk based upon the original disk of an optical disk substrate that has been formed as described above and using the resulting mask original disk.

[Embodiment 2]

Referring mainly to FIG. 5, the following description will discuss another embodiment of an optical disk substrate of the present invention.

Figure 5A:
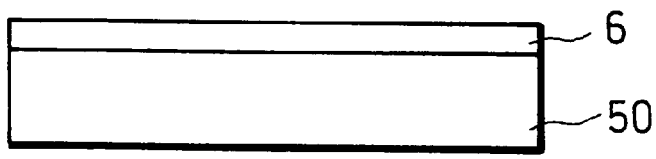
FIGS. 5(a) through 5(f) are explanatory drawings that respectively show main processes of a manufacturing method of an optical disk substrate in another embodiment of the present invention.

The optical disk substrate 5 of the present embodiment is virtually the same as the optical disk substrate 5 explained in Embodiment 1; however, it is different in substrate materials and manufacturing processes. Referring to FIGS. 5(a) through 5(f), an explanation will given of the manufacturing processes of the optical disk substrate 5 of the present embodiment as follows:

As illustrated in FIG. 5(a), photoresist 6 is applied to one surface of a glass substrate 50.

Figure 5B:
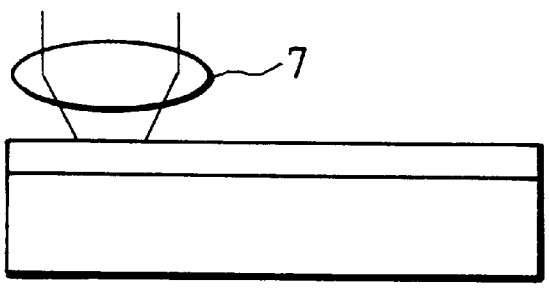

As illustrated in FIG. 5(b), a laser light beam is converged by an objective lens 7 onto the photoresist 6 so that the photoresist 6 is exposed so as to form patterns of desired winding groove 1a and normal groove 1b.

Figure 5C:
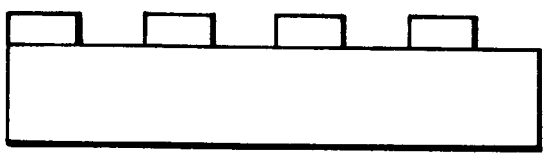

As illustrated in FIG. 5(c), the exposed photoresist 6 is developed and removed, and subsequently, the desired patterns are formed by the residual photoresist 6.

Figure 5D:
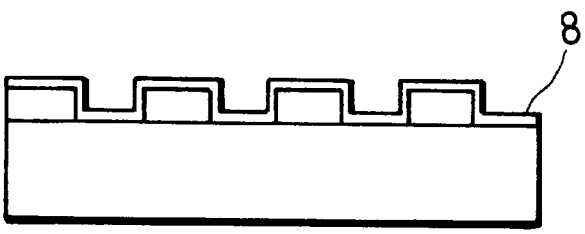

As illustrated in FIG. 5(d), a conductive thin film 8 is formed on the patterns made of the photoresist 6 by sputtering, electroless plating or other methods.

Figure 5E:
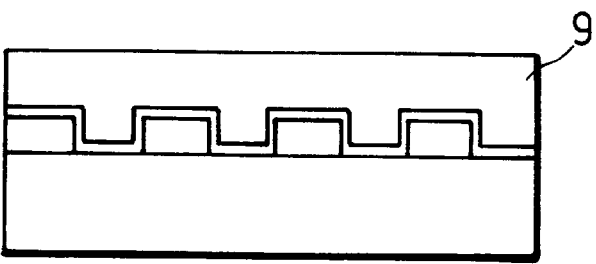

As illustrated in FIG. 5(e), a metal layer 9 is formed on the thin-film 8 by electrocasting or other methods.

Figure 5F:
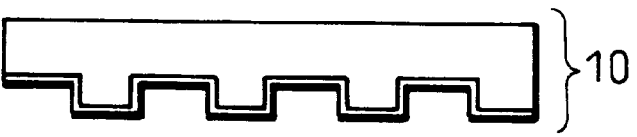

As illustrated in FIG. 5(f), the thin-film 8 and the metal layer 9 are separated from the photoresist 6 and the glass substrate 50. The separated thin-film 8 and the metal layer 9 form a stamper 10.

Here, Ni, Ta, Cr or an alloy of these materials is used as the material of the thin-film 8, or a composite film of these materials is applied, and Ni, Ta, Cr or an alloy of these materials is also used as the material of the metal layer 9, or a composite film of these materials is applied.

By using the above-mentioned stamper 10, an optical disk substrate 5, made of plastic, is manufactured through injection molding or injection pressure molding. Thermoplastic resins, such as polycarbonate resin, acryl resin, ethylene resin, ester resin, nylon resin or APO, are used as the plastic material.

Moreover, the manufacturing method of the stamper 10 of the present embodiment is not intended to be limited to the above-mentioned arrangement, and the stamper may be made based upon an original disk of an optical disk substrate that has been formed by the manufacturing method of Embodiment 1.

The application of the stamper 10 formed as described above makes it possible to manufacture an optical disk substrate 5 by using resin, thereby contributing to mass production and cost reduction.

[Embodiment 3]

Figure 6:
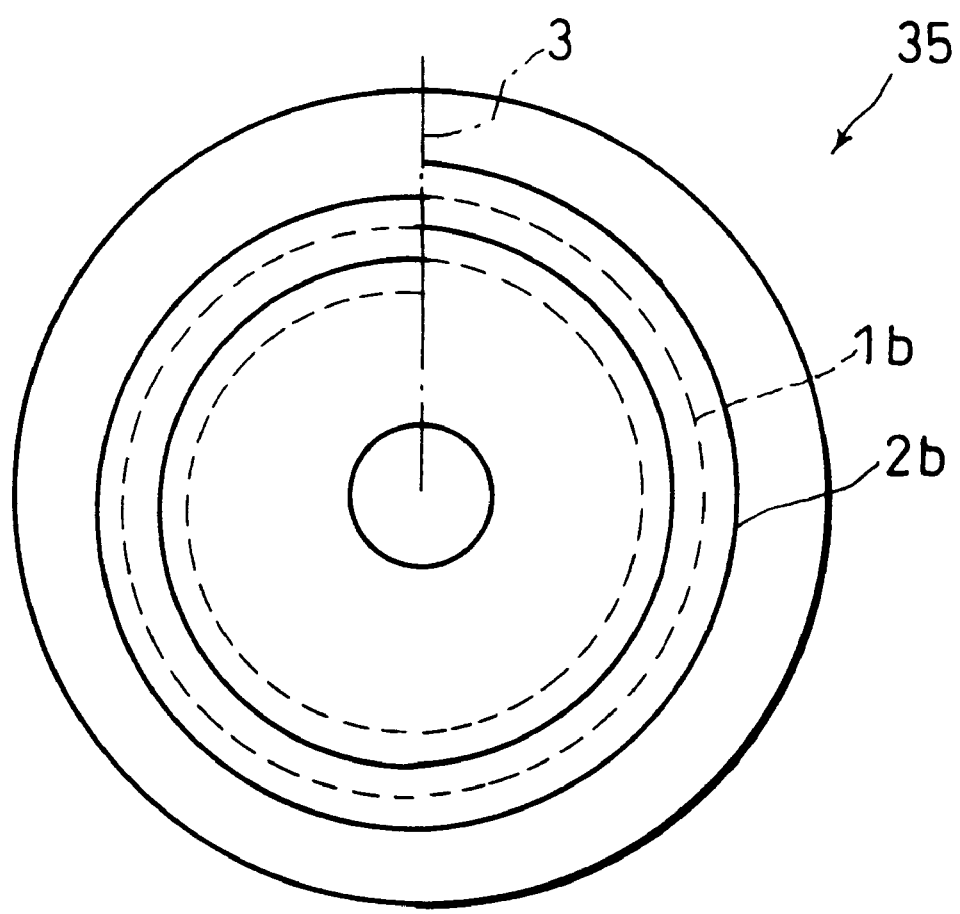
FIG. 6 is a plan view that shows a schematic construction of an optical disk substrate of still another embodiment of the present invention.

Referring to FIGS. 6 and 7, the following description will discuss still another embodiment of an optical disk substrate of the present invention.

Figure 7A:
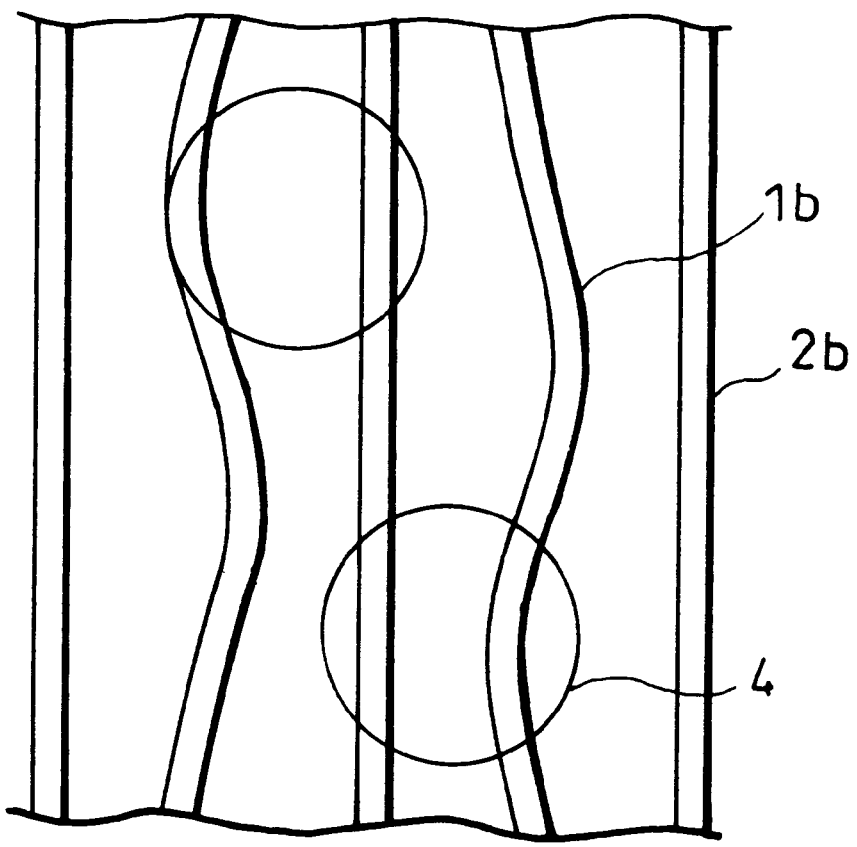
FIG. 7(a) is a plan view that shows one portion of the optical disk substrate of FIG. 6 in an enlarged manner.
Figure 7B:
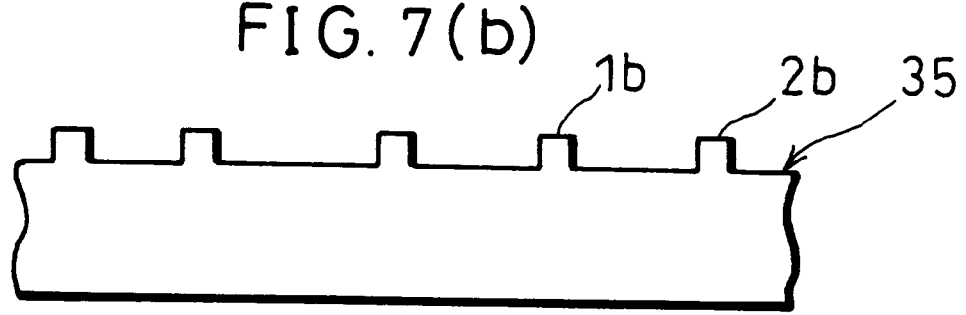
FIG. 7(b) is a cross-sectional view that shows a cross-section taken along the radius of the optical disk substrate.

As illustrated in FIGS. 6 and 7, on the optical disk substrate 35 of the present embodiment, a tracking-use winding land (indicated by the first portion) 1b, which is, winding, and a tracking-use normal land (indicated by the second portion) 2b, which is not winding, are formed alternately in the disk radial direction. FIG. 6 is a plan view of the optical disk substrate 35, FIG. 7(a) is a plan view that shows one portion of the optical disk substrate 35 in an enlarged manner, and FIG. 7(b) is a cross-sectional view when seen the optical disk substrate 35 is cut along the radius thereof. Further, as illustrated in FIG. 6, the winding land 1b and the normal land 2b are placed so that they follow each other alternately at switching sections 3 in the disk circumferential direction. The winding land 1b and the normal land 2b are formed into a spiral shape. A region between the winding land 1b and the normal land 2b is referred to as a groove.

The winding land 1b is winding in the disk radial direction in accordance with address information, and its winding frequency is set at a value that is higher than a follow-up frequency of the tracking servo system and that is also lower than a recording frequency.

In an optical disk using the optical disk substrate 35 of this type, information is recorded in the groove. The tracking signal is obtained by, for example, the push-pull method. The address information is found by extracting 4 components of the winding frequency of the winding land 1b from the tracking signal.

More specifically, at the time when a recording-reproduction-use light spot 4 is applied so as to follow the groove, since the winding frequency is higher than the follow-up frequency of- the tracking servo system, the recording-reproduction-use light spot 4 tracks virtually the center line of the average width of the groove. For this reason, a tracking error signal that corresponds to the winding amplitude of the winding land 1b is always generated. Therefore, the signal component of the winding frequency is obtained by extracting the tracking error signal from the tracking signal.

Further, the address information of the winding land 1b can serve as common address information related to two grooves that are adjacent to both sides of the winding land 1b, and whether the recording-reproduction-use light spot 4 is following the groove on the right side or the groove on the left side of the winding land 1b can be judged depending on whether the tracking error signal is being generated on the left area or on the right area of the recording-reproduction-use light spot 4. Thus, since it is possible to easily make a selection as to whether the recording-reproduction-use light spot 4 is following the groove on the right side or the groove on the left side of the winding land 1b, a specific track can be easily identified.

In the optical disk device 35 of the present embodiment, the diameter of the recording-reproduction-use light spot 4 is set greater than the track pitch but smaller than double the track pitch; therefore, it is avoidable to direct the recording-reproduction-use light spot 4 on two winding lands 1b at the same time, thereby making it possible to obtain accurate address information.

In the above-mentioned explanation, the signal component of the winding frequency is extracted from the tracking signal; however, the signal component of the winding frequency can be extracted from the change in the amount of light reflected from the optical disk. In other words, by utilizing the fact that the reflected light becomes weaker with a narrowed groove and the reflected light becomes stronger with a widened groove, the change in the amount of the reflected light is extracted so that the signal component of the winding frequency is obtained.

With respect to the manufacturing processes and substrate materials of the optical disk substrate 35 in accordance with the present embodiment, the same manufacturing processes and substrate materials as those explained in Embodiments 1 and 2 can be adopted. Additionally, the optical disk substrate 5, explained in Embodiments 1 and 2, and the optical disk device 35 of the present embodiment have a relationship in which the recessions and protrusions are mutually reversed; therefore, in its manufacturing processes, the optical disk substrate 35 of the present embodiment can be produced by copying the original disk of the optical disk substrate that was made by the manufacturing processes explained in Embodiments 1 and 2. Moreover, the manufacturing processes of the optical disk substrate 35 are not limited to those described above: A mask original disk is made based upon the optical disk substrate produced as described above and the mask original disk may be used to produce the optical disk substrate 35. Further, a stamper is made based upon the original disk of the optical disk substrate so as to produce the optical disk substrate 35. Although this makes the manufacturing processes complicated due to the additional one step, groove recording is available.

[Embodiment 4]

Figure 8:
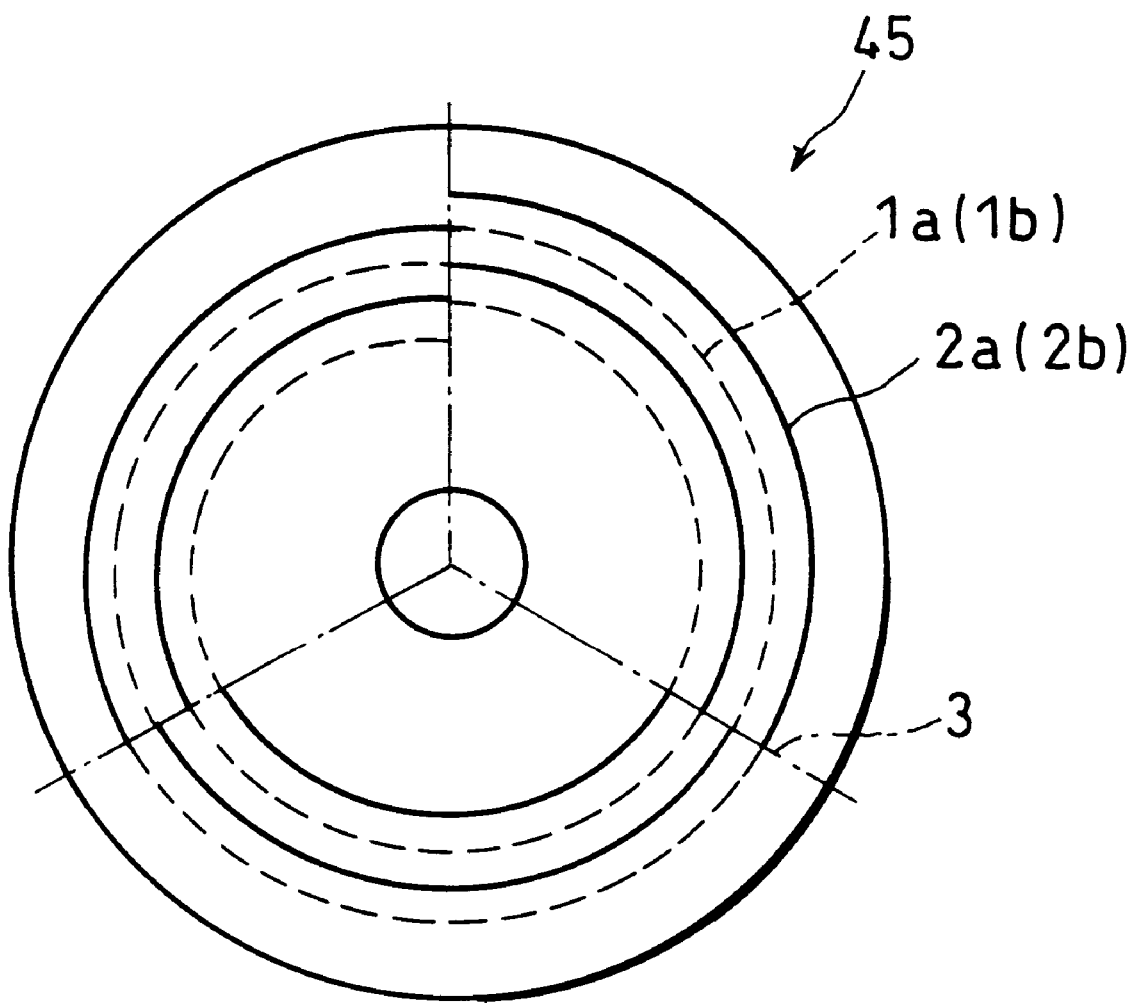
FIG. 8 is a plan view that shows a schematic construction of an optical disk substrate of still another embodiment of the present invention.

Referring to FIG. 8, the following description will discuss still another embodiment of an optical disk substrate of the present invention.

As illustrated in FIG. 8, on the optical disk substrate 45 of the present embodiment, a winding groove 1a and a normal groove 2a are formed in a spiral shape. The winding groove 1a and the normal groove 2a are formed alternately in the disk radial direction, and designed so that the winding groove 1a and the normal groove 2a follow each other alternately in the circumferential direction at each one-third of a revolution.

In other words, the winding groove 1a and the normal groove 2a of the optical disk substrate 45 are alternately formed in the manufacturing process by ON-OFF control of the light-deflecting device 23 that is carried out by the driver 26 shown in FIG. 4 at three switching sections 3 that are placed with constant angular intervals as shown in FIG. 8, that is, three times per one revolution.

Thus, the address information of the winding groove 1a can serve as common address information related to two lands that are adjacent to both sides thereof, and since the winding side on which the address information is formed is frequently changed, it is possible to identify a specific track more accurately.

Additionally, in this embodiment, the explanation has been given of the case in which the winding groove 1a and the normal groove 2a are used for tracking control; however, the winding land 1b and the normal land 2b may of course be used.

Further, with respect to the manufacturing method of the optical disk substrate 45 and the substrate materials, the same manufacturing method and substrate materials as those explained in Embodiments 1 through 3 may be adopted.

[Embodiment 5]

Referring to FIG. 9, the following description will. discuss still another embodiment of an optical disk substrate of the present invention.

Figure 9A:
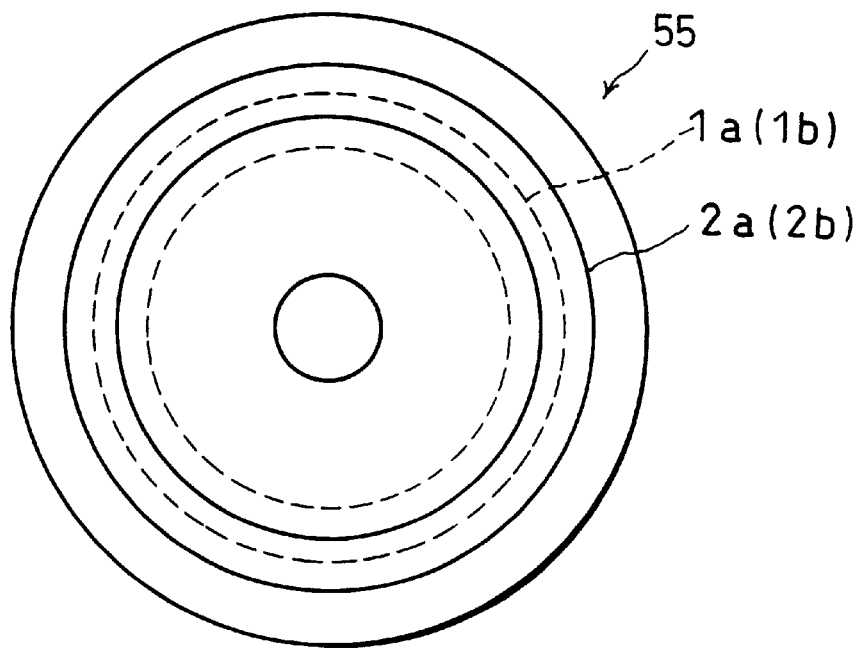
FIG. 9(a) is a plan view that shows a schematic construction of an optical disk substrate of still another embodiment of the present invention.

As illustrated in FIG. 9(a), on the optical disk substrate 55 of the present embodiment, tracking-use winding grooves 1a (or winding lands 1b), which are winding, and tracking-use normal grooves 2a (or normal lands 2b), which are not winding, are formed in the shape of concentric circles.

Figure 9B:
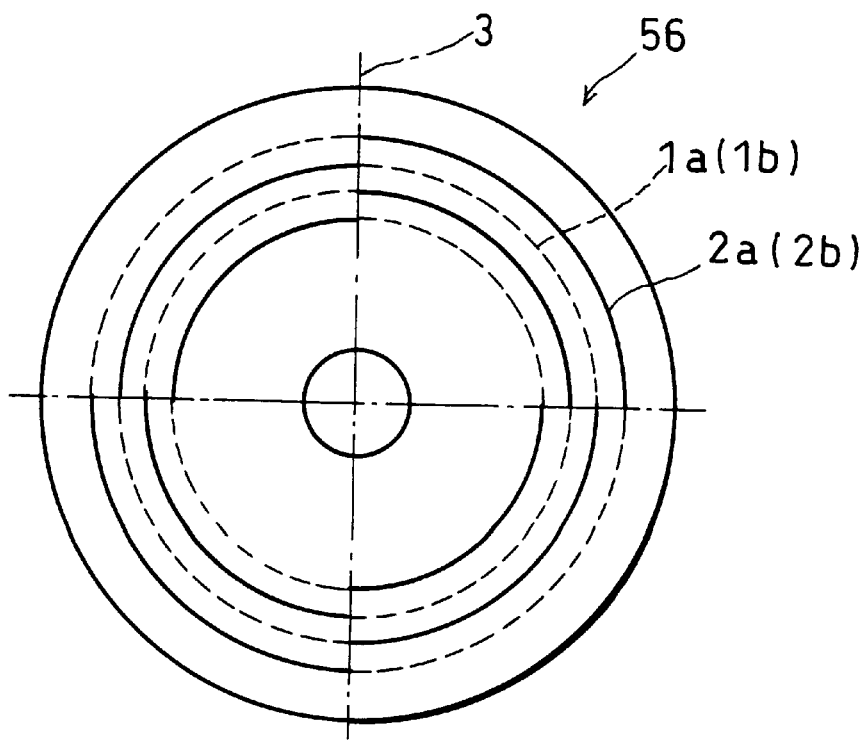
FIG. 9(b) is a modified example thereof.

An optical disk substrate 56 as shown in FIG. 9(b) is a modified example of the optical disk substrate 55 shown in FIG. 9(a), and has grooves (or lands) that are formed in the shape of concentric circles in a manner similar to the optical disk substrate 55 shown in FIG. 9(a); however, in each revolution of the disk, there are two of the trackinguse winding grooves 1a (or the winding lands 1b) that are winding and two of the tracking-use normal grooves 2a (or the normal lands 2b) that are not winding, for a total of four. In other words, in the circumferential direction of the disk, the winding grooves 1a (or the winding lands 1b) and the normal grooves 2a (or the normal lands 2b) are alternately formed at each central angle of 90°.

These winding grooves 1a (or winding lands 1b) and normal grooves 2a (or normal lands 2b) are formed in the manufacturing process by ON-OFF control of the light-deflecting device 23 that is carried out by the driver 26 shown in FIG. 4 at four switching sections 3 that are placed with constant angular intervals as shown in FIG. 9(b), that is, four times per one revolution.

In the arrangement of FIG. 9(b), the address information of the winding grooves 1a (or the winding lands 1b) can serve as common address information related to two lands (or grooves) that are adjacent to both sides thereof, and since the side on which the address information is formed is frequently switched, it is possible to identify a specific track more accurately.

[Embodiment 6]

Figure 10:
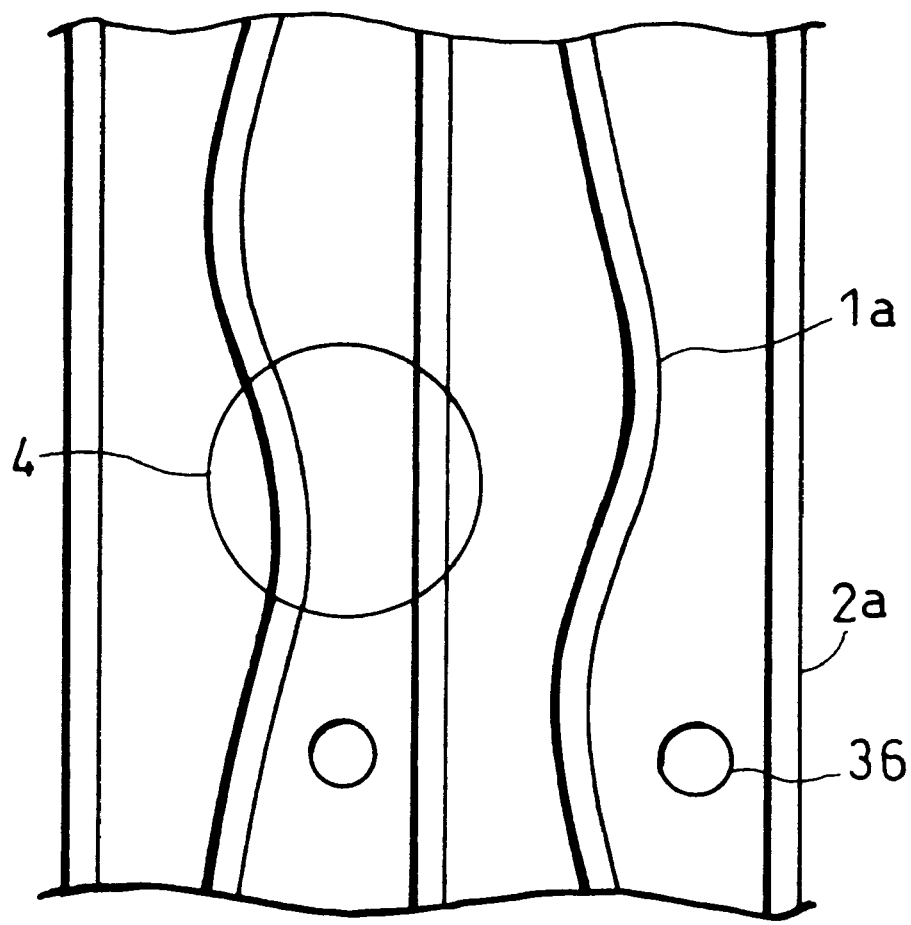
FIG. 10 is a plan view that shows a schematic construction of an optical disk substrate of still another embodiment of the present invention.
Figure 11:
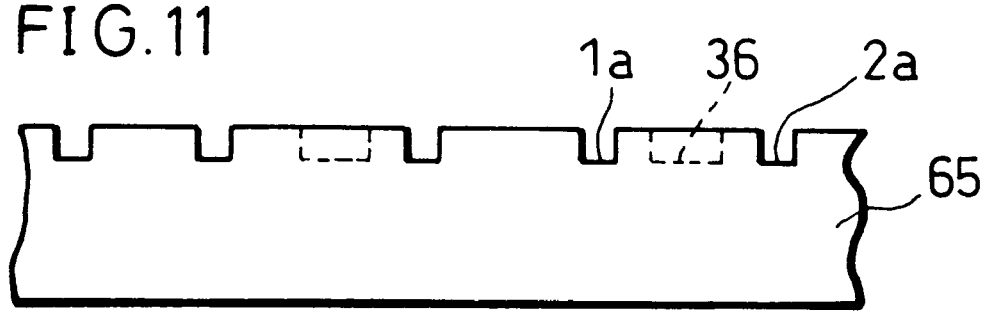
FIG. 11 is a cross-sectional view that shows a cross-section taken along the radius of the optical disk substrate shown in FIG. 10.

Referring to FIGS. 1, 10 and 11, the following description will discuss still another embodiment of an optical disk substrate of the present invention.

As illustrated in FIGS. 1, 10 and 11, on the optical disk substrate 65 of the present embodiment that is made of a material such as light-transmitting glass and plastic, a tracking-use winding groove (indicated by the first portion) 1a, which is winding, and a tracking-use normal groove (indicated by the second portion) 2a, which is not winding, are formed alternately in the disk radial direction. Further, in the disk circumferential direction, the winding groove 1a and the normal groove 2a are placed so that they follow each other alternately at switching sections 3. The winding groove 1a and the normal groove 2a are formed into a spiral shape. A region between the winding groove 1a and the normal groove 2a is referred to as a land. Here, supposing that the refractive index of the disk substrate 65 is n, the depth of the groove is set in the vicinity of λ/8n.

Moreover, a number of tracking guides are formed in the disk radial direction, and pits 36 are formed alternately in every second area between the tracking guides. Supposing that the refractive index of the disk substrate 65 is n, the depth of the pit 36 is set in the vicinity of λ/8n to λ/4n.

The winding groove 1a is winding in the disk radial direction in accordance with address information, and its winding frequency is set at a value that is higher than a follow-up frequency of the tracking servo system and that is also lower than a recording frequency.

In an optical disk using the optical disk substrate of this type, the tracking signal is obtained by, for example, the push-pull method. The address information is found by extracting components of the winding frequency of the winding groove 1a from the tracking signal.

More specifically, at the time when a recording-reproduction-use light spot 4 (a main-beam spot) is applied so as to follow the land, since the winding frequency is higher than the follow-up frequency of the tracking servo system, the recording-reproduction-use light spot 4 tracks. virtually the center line of the average width of the land. For this reason, the signal component of the winding frequency is obtained by extracting a tracking error signal that corresponds to the winding amplitude of the winding groove 1a.

Moreover, since the pits 36 are formed alternately in every second area between the tracking guides in the disk radial direction, it is possible to easily find the absolute address of the main-beam spot by confirming which side (right or left) of the winding groove 1a is being reproduced based upon the presence or absence of the pits 36. Therefore, it becomes possible to reproduce the address information accurately based upon the reproducing signal from the pits 36 and the winding frequency of the winding groove 1a.

In the above-mentioned explanation, the signal component of the winding frequency is extracted from the tracking signal; yet, the signal component of the winding frequency can be extracted from the change in the amount of light reflected from the optical disk. In other words, since the amount of the reflected light changes depending on cases when the winding groove 1a is located in a central portion of the sub-beam spot and when it is located in an outer edge portion thereof, the signal component of the winding frequency is obtained by extracting the change in the amount of light.

In the present embodiment, the pits 36 are formed alternately in every second area between the tracking guides in the radial direction. More specifically, they are formed in a manner "0, 1, 0, 1, . . . " in the radial direction; however, they may of course be formed so that the absolute addresses are provided in a manner "1, 2, 1, 2, . . . ",or provided in a manner "0, 1, 2, 3, . . ." so as to represent track numbers of all the tracks.

[Embodiment 7]

Figure 12:
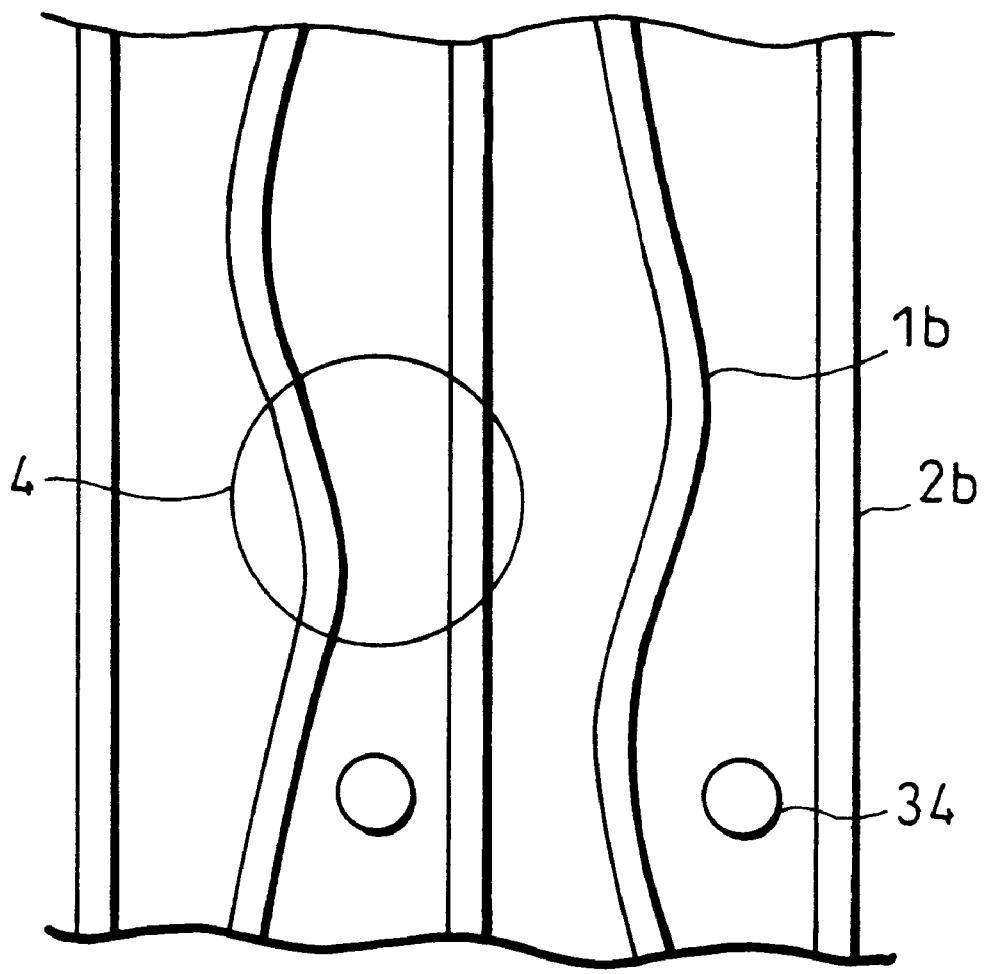
FIG. 12 is a plan view that shows a schematic construction of an optical disk substrate of still another embodiment of the present invention.
Figure 13:
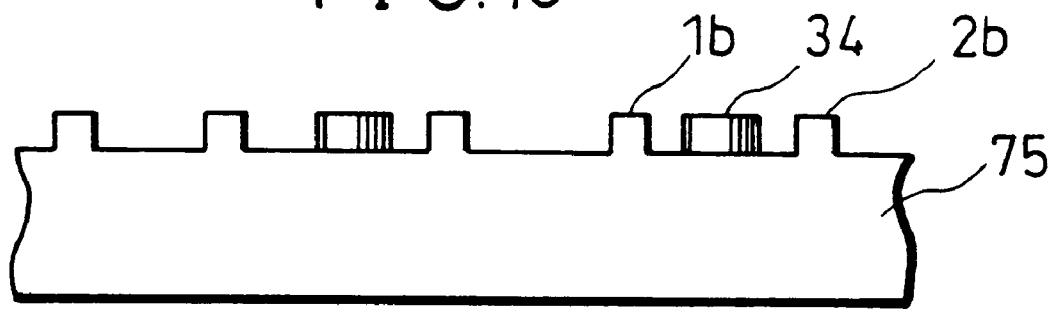
FIG. 13 is a cross-sectional view that shows a cross-section taken along the radius of the optical disk substrate shown in FIG. 12.

Referring to FIGS. 4, 12 and 13, the following description will discuss still another embodiment of an optical disk substrate of the present invention.

As illustrated in FIGS. 4, 12 and 13, on the optical disk substrate 75 of the present embodiment that is made of a material such as light-transmitting glass and plastic, a tracking-use winding land 1b, which is winding, and a tracking-use normal land 2b, which is not winding, are formed alternately in the disk radial direction. Further, in the disk circumferential direction, the winding land 1b and the normal land 2b are placed so that they follow each other alternately at switching sections 3. The winding land 1b and the normal land 2b are formed into a spiral shape. A region between the winding land 1b and the normal land 2b is referred to as a groove. Here, supposing that the. refractive index of the disk substrate 75 is n, the height of the land is set in the vicinity of λ/8n.

Moreover, a number of guides are formed in the disk radial direction, and raised portions 34 are formed alternately in every second area between the guides. Supposing that the refractive index of the disk substrate 75 is n, the height of the raised portion 34 is set in the vicinity of λ/8n to λ/4n.

The winding land 1b is winding in the disk radial direction in accordance with address information, and its winding frequency is set at a value that is higher than a follow-up frequency of the tracking servo system and that is also lower than a recording frequency.

In an optical disk using the optical disk substrate 75 of this type, information recording is carried out with respect to the groove. In the same manner as Embodiment 6, the tracking signal is obtained by, for example, the pushpull method. The address information is found by extracting the winding-frequency component of the winding land 1b from the tracking signal and finding the reproducing signal from the raised portions 34.

Since the optical disk substrate 75 of the present embodiment and the optical disk substrate 65 of Embodiment 6 have a relationship in which the lands and grooves are mutually reversed, the manufacturing processes become more. complicated due to the additional one process; however, this arrangement allows groove recording.

[Embodiment 8]

Figure 14:
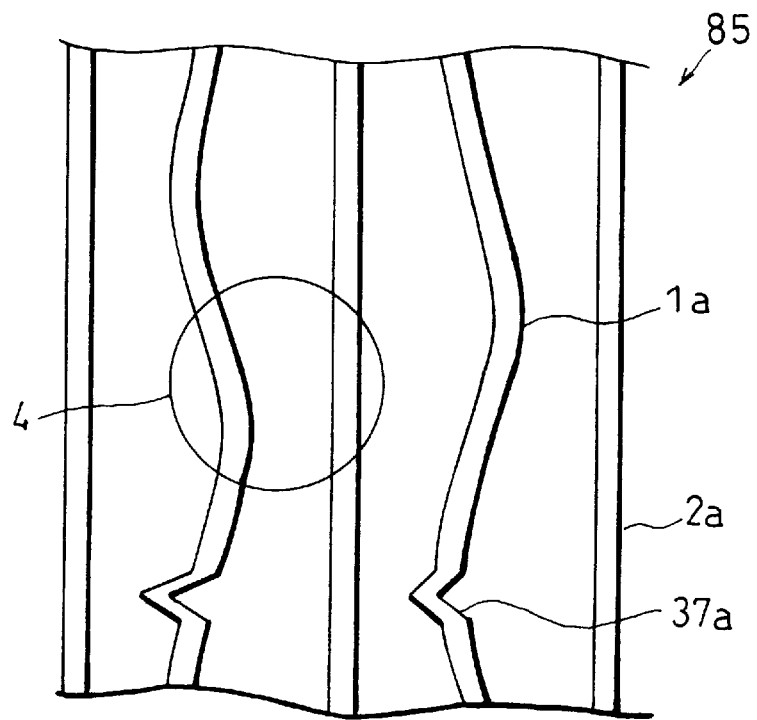
FIG. 14 is a plan view that shows a schematic construction of an optical disk substrate of still another embodiment of the present invention.
Figure 15:
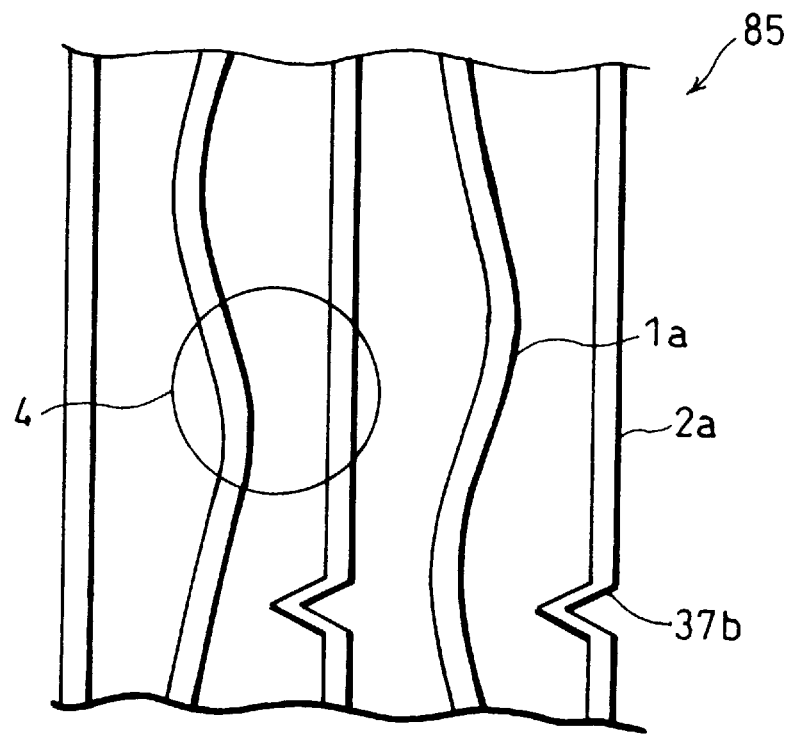
FIG. 15 is a plan view that shows a modified example thereof.

Referring to FIGS. 14 and 15, the following description will discuss still another embodiment of an optical disk substrate of the present invention.

As illustrated in FIG. 14, on the optical disk substrate 85 of the present embodiment that is made of a material such as light-transmitting glass and plastic, a tracking-use winding groove 1a (the first portion), which is winding, and a tracking-use normal groove 2a (the second portion), which is not winding, are formed alternately in the disk radial direction.

Further, in the disk circumferential direction, the winding groove 1a and the normal groove 2a are placed so that they follow each other alternately at switching sections 3. The winding groove 1a and the normal groove 2a are formed into a spiral shape. A region between the winding groove 1a and the normal groove 2a is referred to as a land. Here, supposing that the refractive index of the disk substrate 85 is n, the depth of the groove is set in the vicinity of $\lambda/8n$.

Moreover, as illustrated in FIG. 14, the optical disk substrate 85 has curvature-alternating sections (absolute-address recognition sections) 37a each of which is placed at one portion of each winding groove 1a and has a greater degree of winding than the normal winding.

FIG. 15 shows a modified example of the optical disk substrate 85 shown in FIG. 14. In this modified example, a bent section 37b is formed at one portion of each normal groove 2a. Here, the curvature at the bent section 37b is greater than the degree of the normal winding of the winding groove 1a.

The winding groove 1a is winding in the disk radial direction in accordance with address information, and its winding frequency is set at a value that is higher than a follow-up frequency of the tracking servo system and that is also lower than a recording frequency.

In an optical disk using the optical disk substrate 85 of this type, information recording is carried out with respect to the land. The tracking signal is obtained by, for example, the push-pull method. The address information is found by extracting the winding-frequency component of the winding groove 1a from the tracking signal.

More specifically, at the time when a recording-reproduction-use light spot 4 (a main-beam spot) is applied so as to follow the land, since the winding frequency is higher than the follow-up frequency of the tracking servo system, the recording-reproduction-use light spot 4 tracks virtually the center line of the average width of the land. For this reason, the signal component of the winding frequency is obtained by extracting a tracking error signal that corresponds to the winding amplitude of the winding groove 1a.

Moreover, the absolute address of the recording-reproduction-use light spot 4 can be found by making a judgement as to the presence or absence of the curvature-alternating section 37a which is formed in one portion of each winding groove 1a or the bent section 37b which is formed in one portion of each normal groove 2a, based upon the tracking error signal. In other words, it is possible to find which side (right or left) of the winding groove 1a is being reproduced by the recording-reproduction-use light spot 4 from the tracking error signal. Therefore, it becomes possible to reproduce the address information easily based upon the winding frequency of the winding groove 1a and the signal from the curvature-alternating sections 37a or the bent sections 37b.

In the above-mentioned explanation, the signal component of the winding frequency is extracted from the tracking signal; however, the signal component of the winding frequency can be extracted from the change in the amount of light reflected from the optical disk. In other words, since the amount of the reflected light changes depending on cases when the winding groove 1a is located in a central portion of the sub-beam spot and when it is located in an outer edge portion thereof, the signal component of the winding frequency is obtained by extracting the change in the amount of light.

In the present embodiment, the curvature-alternating sections 37 are formed in a manner so as to represent "0, 1, 0, 1, . . ."; however, they may of course be formed so that the absolute addresses are provided in a manner "1, 2, 1, 2, . . .", or provided in a manner "0, 1, 2, 3, . . ." so as to represent track numbers of all the tracks.

Additionally, the present embodiment discussed a case in which the grooves 1a and 2a are used for tracking control; however, the lands 1b and 2b may of course be used.

[Embodiment 9]

Figure 16:
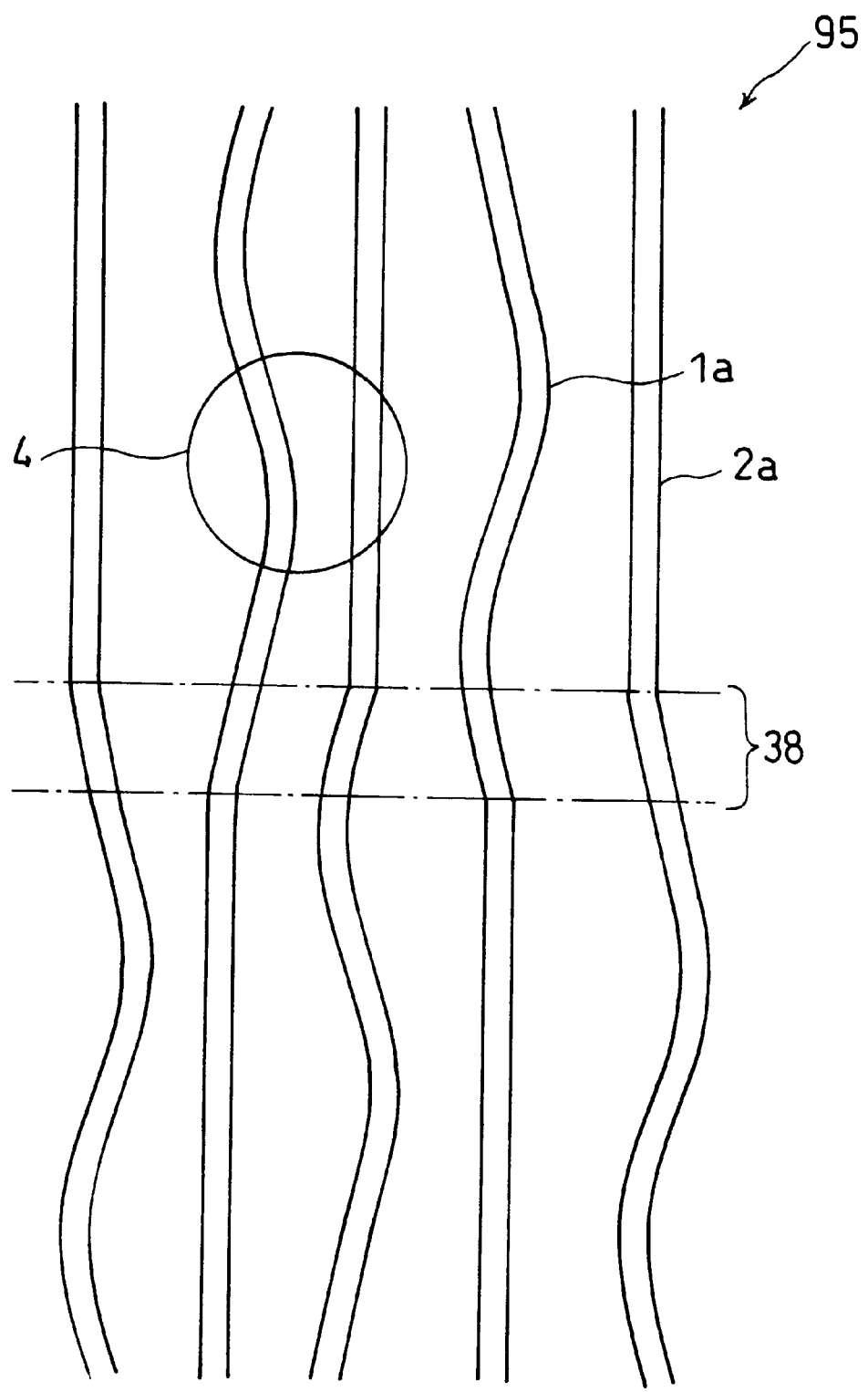
FIG. 16 is a plan view that shows a schematic construction of an optical disk substrate of still another embodiment of the present invention.

Referring to FIGS. 16, the following description will discuss still another embodiment of an optical disk substrate of the present invention.

On the optical disk substrate 95 of the present embodiment that is made of a material such as light-transmitting glass and plastic, a tracking-use winding groove 1a (the first portion), which is winding, and a tracking-use normal groove 2a (the second portion), which is not winding, are formed alternately in the disk radial direction. Further, the winding groove 1a and the normal groove 2a are placed in an adjacent manner in the disk. circumferential direction. The winding groove 1a and the normal groove 2a are formed into a spiral shape. A region between the winding groove 1a and the normal groove 2a is referred to as a land. Here, supposing that the refractive index of the disk substrate 95 is n, the depth of the groove is set in the vicinity of $\lambda/8n$.

FIG. 16 is an partially enlarged plan view that shows a portion at which the winding groove 1a and the normal groove 2a are adjacent to each other in the optical disk substrate 95 of the present embodiment. As illustrated in FIG. 16, at the adjacent portions of the winding groove 1a and the normal groove 2a on the optical disk substrate 95, a region in which all the adjacent tracks in the disk radial direction are winding within a predetermined length, that is, an all-track winding region 38 (an absolute address recognition section), is formed.

The winding groove 1a is winding in the disk radial direction in accordance with address information, and its winding frequency is set at a value that is higher than a follow-up frequency of the tracking servo system and that is also lower than a recording frequency.

In an optical disk using the optical disk substrate 95 of this type, information recording is carried out with respect to the land. The tracking signal is obtained by, for example, the push-pull method. The address information is found by extracting the winding-frequency component of the winding groove 1a from the tracking signal.

More specifically, at the time when a recording-reproduction-use light spot 4 (a main-beam spot) is applied so as to follow the land, since the winding frequency is higher than the follow-up frequency of the tracking servo system, the recording-reproduction-use light spot 4 tracks virtually the center line of the average width of the land. For this reason, the signal component of the winding frequency is obtained by extracting a tracking error signal that corresponds to the winding amplitude of the winding groove 1a.

When the recording-reproduction-use light spot 4 reaches the all-track winding region 38, the resulting winding frequency forms a mixture of winding frequencies from the two adjacent tracking guides. Therefore, it becomes possible to easily find which track the recording-reproduction-use light spot 4 is scanning based upon the winding frequency.

In the above-mentioned explanation, the signal component of the winding frequency is extracted from the tracking signal; however, the signal component of the winding frequency can be extracted from the change in the amount of light reflected from the optical disk. In other words, since the amount of the reflected light changes depending on cases when the winding groove 1a is located in a central portion of the sub-beam spot and when it is located in an outer edge portion thereof, the signal component of the winding frequency is obtained by extracting the change in the amount of light.

Additionally, the present embodiment discussed a case in which the grooves 1a and 2a are used for tracking control; however, the lands 1b and 2b may of course be used.

[Embodiment 10]

Figure 17:
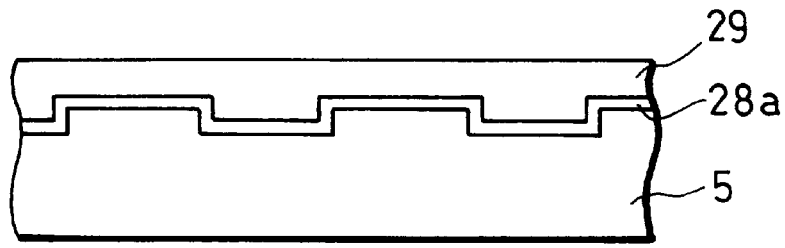
FIGS. 17 through 22 are cross-sectional views each of which shows a schematic construction of an optical disk of an embodiment of the present invention.

Referring to FIG. 17, the following description will discuss one embodiment of an optical disk of the present invention. Here, the optical disk of the present embodiment is manufactured by using any of the optical disk substrates that have been respectively discussed in Embodiments 1 through 9 and forming various layers as will be described below. In this embodiment, an explanation will be given by exemplifying a case in which the optical disk substrate 5 explained in Embodiment 1 is used.

As illustrated in FIG. 17, the optical disk of the present embodiment has a construction in which a magneto-optical recording layer 28a and an overcoat layer 29 are successively stacked on an optical disk substrate 5. The magneto-optical recording layer 28a, not shown, is constituted by a light-transmitting dielectric layer, a magnetic layer, a protective layer and a reflection layer, and the magnetic layer is made of a rare-earth-metal-transition-metal alloy selected from, for example, DyFeCo, TbFeCo, DyTbFeCo, GdTbFe, GdTbFeCo, etc.

The magnetic layer has the property of exhibiting perpendicular magnetization within the range from room temperature to the Curie Point.

In the above-mentioned arrangement, information recording is carried out in the following processes. First, (1) the temperature of the magnetic layer is raised to the vicinity of the Curie Point by applying a laser light beam so that the magnetization of the magnetic layer becomes zero or the magnetization is inverted upon application of recording magnetization, and in this state, the magnetization of the magnetic layer is aligned upward by applying, for example, upward recording magnetization. Thereafter, (2) in the same manner, the temperature of the magnetic layer is raised to the vicinity of the Curie Point by applying a laser beam so that the magnetization of the magnetic layer becomes zero or the magnetization is inverted upon application of recording magnetization, and in this state, the magnetization of the magnetic layer is aligned downward by applying the opposite-direction recording magnetization, that is, downward recording magnetization. Thus, information is recorded.

Here, in actual processes, either of the light-modulation recording method using a modulated laser light beam and the magnetic-field modulation recording method using a modulated recording magnetic field can be adopted.

Consequently, an optical disk (a magneto-optical disk), which enables re-writing operations of not less than 1 million times, can be achieved.

[Embodiment 11]

Figure 18:
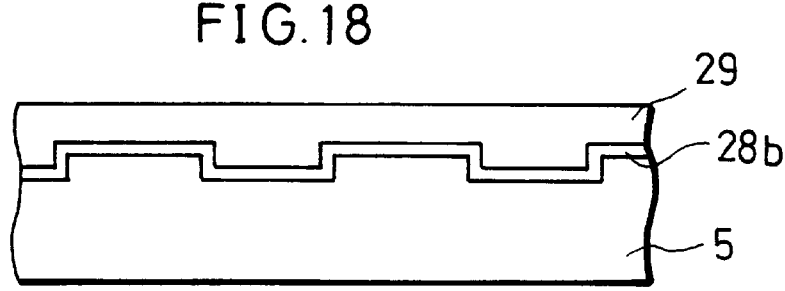

Referring to FIG. 18, the following description will discuss another embodiment of an optical disk of the present invention. Here, the optical disk of the present embodiment is manufactured by using any of the optical disk substrates that have been respectively discussed in Embodiments 1 through 9 and forming various layers as will be described below. In this embodiment, an explanation will be given by exemplifying a case in which the optical disk substrate 5 explained in Embodiment 1 is used.

As illustrated in FIG. 18, the optical disk of the present embodiment has a construction in which a phase-change-type recording layer 28b and an overcoat layer 29 are successively stacked on an optical disk substrate 5. The phase-change-type recording layer 28b, not shown, is constituted by a light-transmitting dielectric layer, a magnetic layer, a protective layer and a reflection layer. The recording layer is made of a phase-change-type recording material, such as GeSbTe.

In the above-mentioned arrangement, when recording is carried out, a high-power laser light beam is applied so that the recording layer attains an amorphous state, and then a low-power laser light beam is applied so that the recording layer attains a crystal state; thus, the recording is complete. Consequently, it is possible to achieve a phase-change-type optical disk which enables a rewriting operation by using only a laser light beam.

[Embodiment 12]

Figure 19:
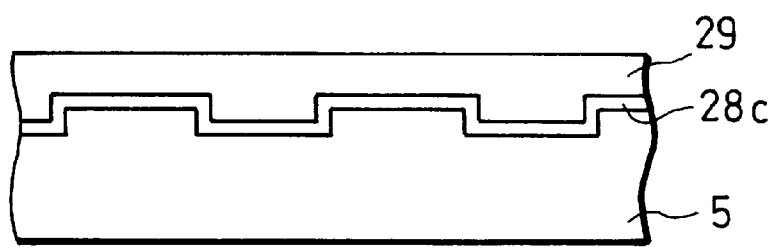

Referring to FIG. 19, the following description will discuss still another embodiment of an optical disk of the present invention. Here, the optical disk of the present embodiment is manufactured by using any of the optical disk substrates that have been respectively discussed in Embodiments 1 through 9 and forming various layers as will be described below. In this embodiment, an explanation will be given by exemplifying a case in which the optical disk substrate 5 explained in Embodiment 1 is used.

As illustrated in FIG. 19, the optical disk of the present embodiment has a construction in which a magneto-optical recording layer 28c and an overcoat layer 29 are successively stacked on an optical disk substrate 5. The magneto-optical recording layer 28c, not shown, is constituted by a light-transmitting dielectric layer, a reproducing magnetic layer, a recording magnetic layer and a dielectric layer, which are stacked in this order. The reproducing magnetic layer is made of a rare-earth-metal-transition-metal alloy selected from, for example, GdFeCo, GdDyFeCo, and the recording magnetic layer is made of a rare-earth-metal-transition-metal alloy selected from, for example, DyFeCo, TbFeCo, DyTbFeCo, GdTbFe, GdTbFeCo, etc. The reproducing magnetic layer has the property of exhibiting in-plane magnetization within the range from room temperature to a predetermined temperature and of exhibiting perpendicular magnetization above the predetermined temperature, and the recording magnetic layer has the property of exhibiting perpendicular magnetization within the range from room temperature to the Curie Point.

In the above-mentioned arrangement, upon recording, the same processes as described in Embodiment 10 are carried out, and upon reproducing, the following processes are carried out.

When a light beam is applied onto the reproducing magnetic layer, the temperature distribution of the irradiated portion has a Gaussian distribution; therefore, only an area smaller than the light-beam diameter has a temperature rise. In accordance with this temperature rise, the magnetization of the temperature-rise portion is shifted from in-plane magnetization to perpendicular magnetization. In other words, the magnetization direction of the recording. magnetic layer is copied onto the reproducing magnetic layer due to an exchange coupling between the two layers, that is, the reproducing magnetic layer and the recording magnetic layer. When the temperature-rise portion is shifted from in-plane magnetization to perpendicular magnetization, only the temperature-rise portion comes to exhibit the magneto-optical effect, and information, recorded on the recording magnetic layer, is reproduced in accordance with light beam reflected from the temperature-rise portion.

Thereafter, when the light beam is shifted to reproduce the next recording bit, the temperature of the previously reproduced portion drops so that a transition from perpendicular magnetization to in-plane magnetization takes place. Accordingly, the temperature-drop portion no longer exhibits the magneto-optical effect so that the magnetization, recorded on the recording magnetic layer, is masked by the in-plane magnetization of the reproducing magnetic layer and is no longer reproduced. This makes it possible to eliminate the intervention of signals from adjacent pits that tends to cause noise.

As described above, in the optical disk of the present embodiment, only the area having a temperature not less than the predetermined temperature is subjected to the reproducing operation; thus, it becomes possible to reproduce a recording bit that is smaller than the diameter of a light beam, and consequently to improve the recording density to a great degree.

[Embodiment 13]

Figure 20:
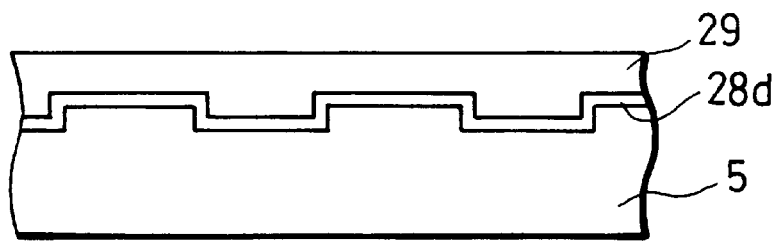

Referring to FIG. 20, the following description will discuss still another embodiment of an optical disk of the present invention. Here, the optical disk of the present embodiment is manufactured by using any of the optical disk substrates that have been respectively discussed in Embodiments 1 through 9 and forming various layers as will be described below. In this embodiment, an explanation will be given by exemplifying a case in which the optical disk substrate 5 explained in Embodiment 1 is used.

As illustrated in FIG. 20, the optical disk of the present embodiment has a construction in which a magneto-optical recording layer 28d and an overcoat layer 29 are successively stacked on an optical disk substrate 5. The magneto-optical recording layer 28d, not shown, is constituted by a light-transmitting dielectric layer, a reproducing magnetic layer, a dielectric layer, a recording magnetic layer and a dielectric layer, which are stacked in this order. The reproducing magnetic layer is made of a rare-earth-metal-transition-metal alloy selected from, for example, GdFeCo, GdDyFeCo, and the recording magnetic layer is made of a rare-earth-metal-transition-metal alloy selected from, for example, DyFeCo, TbFeCo, DyTbFeCo, GdTbFe, GdTbFeCo, etc. The reproducing magnetic layer has the property of exhibiting in-plane magnetization within the range from room temperature to a predetermined temperature and of exhibiting perpendicular magnetization above the predetermined temperature, and the recording magnetic layer has the property of exhibiting perpendicular magnetization within the range from room temperature to the Curie Point.

In the above-mentioned arrangement, when information is recorded and reproduced, the same processes as described in Embodiment 12 are carried out.

Since the optical disk of the present embodiment has a dielectric layer between the reproducing magnetic layer and the recording magnetic layer, it becomes possible to reduce the recording magnetic field in addition to the advantages that it is possible to reproduce a recording bit that is smaller than the diameter of a light beam, and consequently to improve the recording density to a great degree.

[Embodiment 14]

Figure 21:
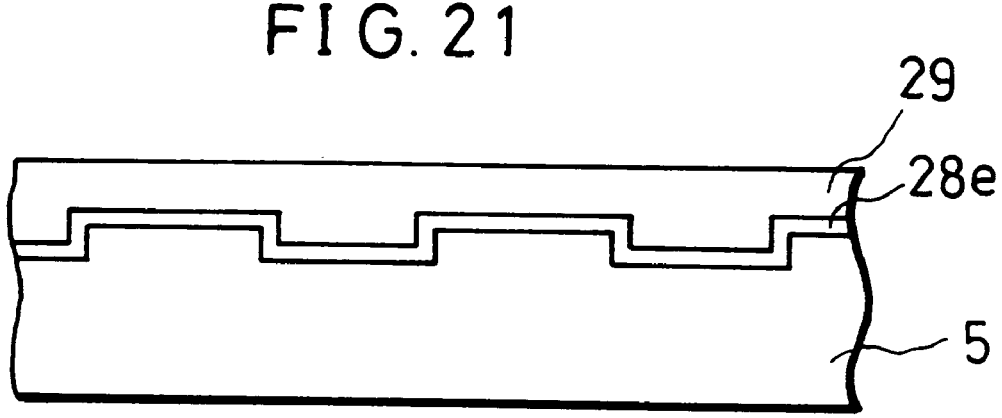

Referring to FIG. 21, the following description will discuss still another embodiment of an optical disk of the present invention. Here, the optical disk of the present embodiment is manufactured by using any of the optical disk substrates that have been respectively discussed in Embodiments 1 through 9 and forming various layers as will be described below. In this embodiment, an explanation will be given by exemplifying a case in which the optical disk substrate 5 explained in Embodiment 1 is used.

As illustrated in FIG. 21, the optical disk of the present embodiment has a construction in which a magneto-optical recording layer 28e and an overcoat layer 29 are successively stacked on an optical disk substrate 5. The magneto-optical recording layer 28e, not shown, is constituted by a light-transmitting dielectric layer, a recording magnetic layer, a recording auxiliary magnetic layer and a dielectric layer, which are stacked in this order. The recording magnetic layer is made of a rare-earth-metal-transition-metal alloy selected from, for example, DyFeCo, TbFeCo, DyTbFeCo, GdTbFe, GdTbFeCo, etc. The recording auxiliary magnetic layer is made of a rare-earth-metal-transition-metal alloy selected from, for example, GdFeCo, GdDyFeCo, GdTbFeCo, etc. With respect to the relationship between the recording magnetic layer and the recording auxiliary magnetic layer in their magnetic properties, the recording magnetic layer has a greater coercive force at room temperature, while the recording auxiliary magnetic layer has a higher Curie temperature.

Here, the following description will briefly discuss an overwriting operation. First, an initializing magnetic field, which is smaller than the coercive force of the recording magnetic layer and which is also greater than the coercive force of the recording auxiliary magnetic layer, is applied; thus, the initializing process is carried out so that the magnetization of only the recording auxiliary layer is aligned in one direction (for example, upward direction) In this case, the initializing process may be carried out all the time, or may be carried out only upon recording. The recording operation is carried out by applying laser light beams that are intensity-modulated to high-power and low-power, while a recording magnetic field is applied.

The intensities of the above-mentioned high-power and low-power are respectively set so that: when the laser light beam of high-power is applied, the present optical disk is subjected to a temperature rise up to a temperature in the vicinity of the Curie Point of the recording auxiliary magnetic layer, or more, and when the laser light beam of low-power is applied, the present optical disk is subjected to a temperature rise up to a temperature in the vicinity of the Curie Point of the recording magnetic layer, or more.

Therefore, upon application of the laser light beam of high-power, the magnetization of the recording auxiliary magnetic layer is inverted to a direction opposite to the initialized direction (for example, downward direction) due to the recording magnetic field, and the magnetization of the recording magnetic layer becomes coincident with the magnetization direction of the recording auxiliary magnetic layer due to an exchanging force that is exerted in the interface during a cooling-off process. Therefore, the magnetization direction of the recording magnetic layer is aligned upward.

On the other hand, when the laser light beam of low-power is applied, the magnetization of the recording auxiliary magnetic layer is not inverted by the recording magnetic field, and the magnetization of the recording magnetic layer becomes coincident with the magnetization direction of the recording auxiliary magnetic layer in the same manner due to an exchanging force that is exerted in the interface during a cooling-off process. Therefore, the magnetization direction of the recording magnetic layer is aligned downward.

Additionally, the recording magnetic field is set substantially smaller than the initializing magnetic field. Further, the intensity of the laser light beam used upon reproducing is set to a level that is substantially lower than the low-power used upon recording. As described above, the present embodiment makes it possible to achieve an optical disk which enables a light-modulation overwriting operation, eliminates an erasing operation, and improves the recording density.

[Embodiment 15]

Figure 22:
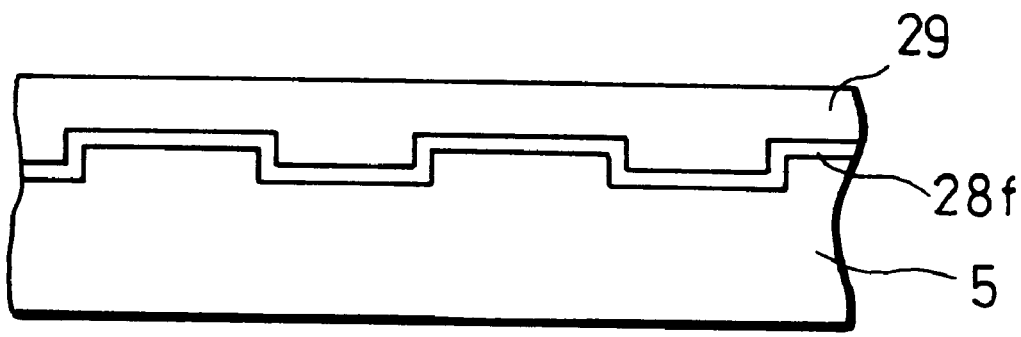
Figure 23A:
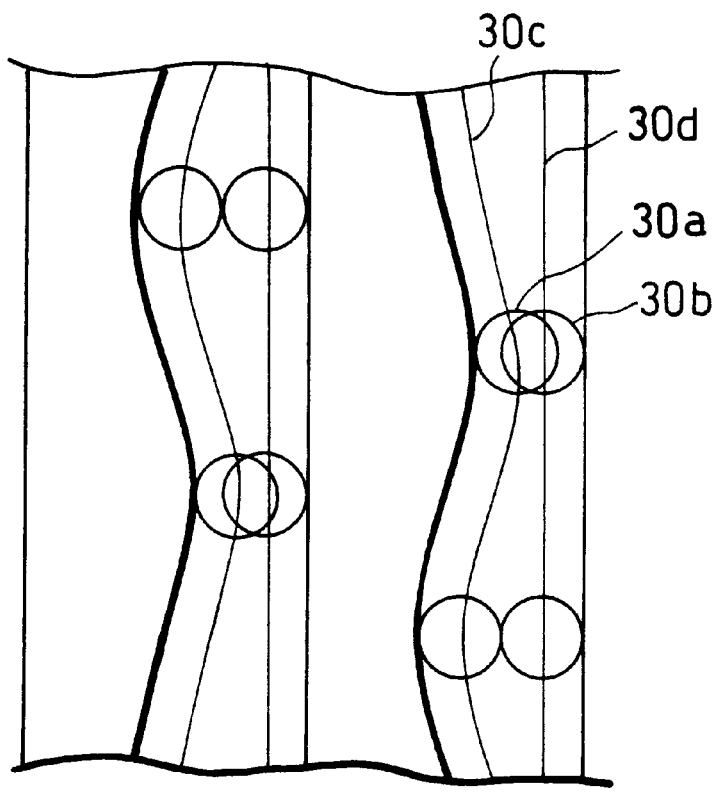
FIG. 23(a) is a plan view that shows a schematic construction of a conventional optical disk substrate.
Figure 23B:
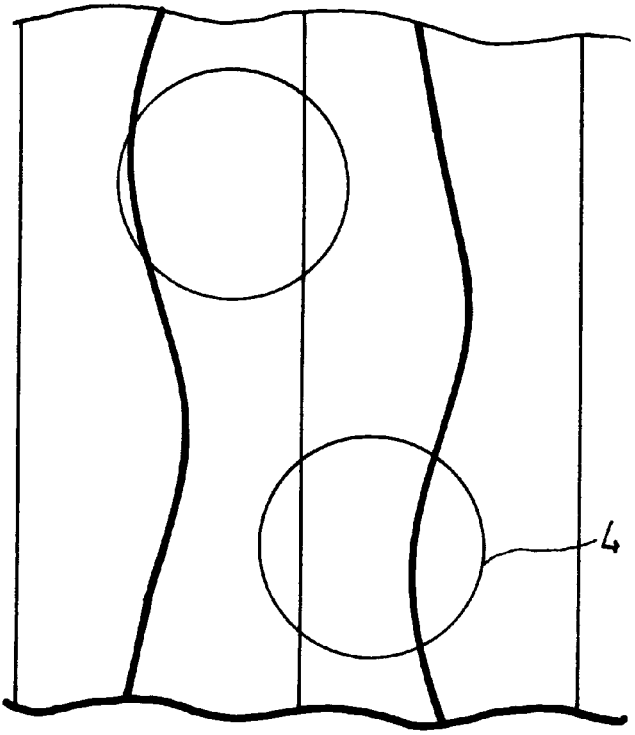
FIG. 23(b) is a plan view that shows one portion thereof in an enlarged manner.
Figure 23C:
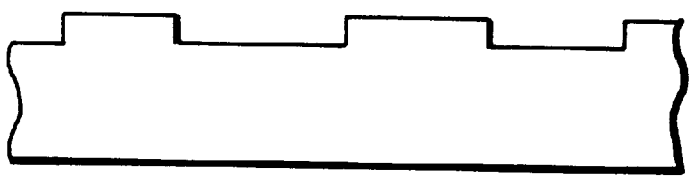
FIG. 23(c) is a cross-sectional view that shows a cross-section taken along the radius of the conventional optical disk substrate.

Referring to FIG. 22, the following description will discuss still another embodiment of an optical disk of the present invention. Here, the optical disk of the present embodiment is manufactured by using any of the optical disk substrates that have been respectively discussed in Embodiments 1 through 9 and forming various layers as will be described below. In this embodiment, an explanation will be given by exemplifying a case in which the optical disk substrate 5 explained in Embodiment 1 is used.

As illustrated in FIG. 22, the optical disk of the present embodiment has a construction in which a magneto-optical recording layer 28f and an overcoat layer 29 are successively stacked on an optical disk substrate 5. The magneto-optical recording layer 28f, not shown, is constituted by a light-transmitting dielectric layer, a recording magnetic layer, a recording auxiliary magnetic layer, a switching magnetic layer, an initializing magnetic layer and a dielectric layer, which are stacked in this order.

The recording magnetic layer is made of a rare-earth-metal-transition-metal alloy selected from, for example, DyFeCo, TbFeCo, DyTbFeCo, GdTbFe, GdTbFeCo, etc., and the recording auxiliary magnetic layer is made of a rare-earth-metal-transition-metal alloy selected from, for example, GdFeCo, GdDyFeCo, GdTbFeCo, etc. The switching magnetic layer is made of a rare-earth-metal-transition-metal alloy, selected from, for example, DyFeCo, TbFeCo, DyTbFe, DyFe, TbFe, etc., and the initializing magnetic layer is made of a rare-earth-metal-transition-metal alloy selected from, for example, GdFeCo, GdDyFeCo, GdTbFeCo, etc.

With respect to magnetic characteristics of the recording magnetic layer, the recording auxiliary magnetic layer, the switching magnetic layer and the initializing magnetic layer, the recording magnetic layer and the initializing magnetic layer have greater coercive forces at room temperature than the recording auxiliary magnetic layer, and the Curie temperatures are set to become higher in the ascending order of the initializing magnetic layer, the recording auxiliary magnetic layer, the recording auxiliary magnetic layer, the recording magnetic layer and the switching magnetic layer.

The optical disk of the present embodiment is a light-modulation overwriting medium which is achieved by using the above-mentioned exchange-coupling four-layered films and which does not require an initializing magnetic field (Hi). Here, the following description will briefly discuss an light-modulation overwriting operation that is applicable to the present optical disk.

In the present optical disk, at room temperature, information is recorded depending on whether the magnetization direction of the recording magnetic layer is, aligned upward or downward. Further, the magnetization of the initializing magnetic layer is always aligned in one direction (for example, upward), and the magnetization of the recording auxiliary magnetic layer is aligned in the same direction as the magnetization of the initializing magnetic layer through the switching magnetic layer.

The recording operation is carried out by applying laser light beams that are intensity-modulated to high-power and low-power, while a recording magnetic field is applied. The intensities of the above-mentioned high-power and low-power are respectively set so that: when the laser light beam of high-power is applied, the present optical disk is subjected to a temperature rise up to a temperature in the vicinity of the Curie Point of the recording auxiliary magnetic layer and when the laser light beam of low-power is applied, the present optical disk is subjected to a temperature rise up to a temperature in the vicinity of the Curie Point of the recording magnetic layer.

Therefore, upon application of the laser light beam of high-power, the magnetization of the recording auxiliary magnetic layer is inverted to downward direction due to the recording magnetic field, and is copied onto the recording magnetic layer due to an exchanging force exerted in the interface during a cooling-off process, and when further cools off, the magnetization of the recording auxiliary magnetic layer is aligned in the same direction as the magnetization of the initializing magnetic layer through the switching magnetic layer. Therefore, the magnetization direction of the recording magnetic layer is aligned downward.

On the other hand, even if the laser light beam of low-power is applied, the magnetization of the recording auxiliary magnetic layer is not inverted by the recording magnetic field since its coercive force is greater than the recording magnetic field, and the magnetization of the recording magnetic layer becomes coincident with the magnetization direction of the recording auxiliary magnetic layer in the same manner due to an exchanging force that is exerted in the interface during a cooling-off process. Therefore, the magnetization direction of the recording magnetic layer is aligned upward. Here, the laser power used upon reproducing is set at a level substantially smaller than the low power used upon recording.

As described above, the optical disk of the present embodiment makes it possible to perform a light-modulation overwriting operation, to eliminate erasing operations, to improve recording speeds, and also to eliminate the initializing magnetic field.

Moreover, with respect to Embodiment 14 and Embodiment 15, a reproducing magnetic layer, as adopted in Embodiment 12 or Embodiment 13, may be installed on the reproducing side of the recording magnetic layer. In this case, since a light-modulation overwriting operation is achieved so that the erasing operation is no longer required, it becomes possible to improve recording speeds, and since recorded bits whose diameter is smaller than the light-beam diameter can be reproduced, it becomes possible to greatly improve the recording density.

Additionally, each of Embodiments 10 through 15 shows one preferred mode for a recording layer; however, the present invention is not intended to be limited thereby, as long as recording and reproducing operations are carried out by using light.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An optical disk substrate comprising:
   a tracking guide constituted by one of a groove and a land; and
   wherein the tracking guide includes a first portion, in which both side walls of the tracking guide are allowed to wind in accordance with address information, and a second portion in which both side walls are not winding, where the first portion and second portion are alternatively placed in a radial direction of the disk.

2. The optical disk substrate as defined in claim 1, wherein the tracking guide is formed with a constant width.

3. The optical disk substrate as defined in claim 1, wherein: the tracking guide is continuously formed in a spiral shape and the first portions and the second portions, the total number per track of which is an odd number, are placed alternately in the disk circumferential direction.

4. The optical disk substrate as defined in claim 1, wherein: the tracking guides are formed in the shape of concentric circles and the first portions and the second portions, the total number per track of which is an even number, are placed alternately in the disk circumferential direction.

5. The optical disk substrate as defined in claim 1, wherein an absolute-address recognition section, formed as a pit, is provided at a region between the two tracking guides that are adjacent to each other in the disk radial direction.

6. The optical disk substrate as defined in claim 1, wherein an absolute-address recognition section, formed as a raised portion, is provided at a region between the two tracking guides that are adjacent to each other in the disk radial direction.

7. The optical disk substrate as defined in claim 1, wherein an absolute-address recognition section, formed as a portion whose curvature partially varies, is provided at least at one of the first portion and the second portion.

8. The optical disk substrate as defined in claim 1, wherein an absolute-address recognition section in which all the adjacent tracking guides in the disk radial direction are winding within a predetermined length is provided.

9. The optical disk substrate as defined in claim 1, wherein the first portion h as a winding frequency that is higher than a follow-up frequency of the tracking guide and that is lower than a recording frequency.

10. A manufacturing method of an optical disk substrate comprising the step of:

forming a pattern of a tracking guide consisting of a first portion in which both side walls of the tracking guide are allowed to wind in accordance with address information and a second portion in which both side walls are not winding, wherein said forming a pattern includes applying a laser light beam while making switches between a first mode, during which the laser light beam being applied is oscillated in a radial direction of the disk in accordance with address information, and a second mode without the oscillation.

11. The manufacturing method of an optical disk substrate as defined in claim 10, wherein the first portion has a winding frequency that is higher than a follow-up frequency of the tracking guide and that is lower than a recording frequency.

12. The manufacturing method of an optical disk substrate as defined in claim 10, wherein switching is carried out between the first mode and the second mode each time the laser light beam travels around the disk.

13. The manufacturing method of an optical disk substrate as defined in claim 10, wherein: the pattern of the tracking guide is continuously formed in a spiral shape and each time the laser light beam travels around the disk, the first portions and the second portions, the total number of which is an odd number, are formed alternately.

14. The manufacturing method of an optical disk substrate as defined in claim 10, wherein: the pattern of the tracking guide is formed in the shape of concentric circles and each time the laser light beam travels around the disk, the first portions and the second portions, the total number of which is an even number, are formed alternately.

15. An optical disk comprising:

an optical disk substrate;

a recording layer formed on the optical disk substrate; and wherein the optical disk substrate includes:

a tracking guide constituted by one of a groove and a land, and wherein the tracking guide includes a first portion, in which both side walls of the tracking guide are allowed to wind in accordance with address information, and a second portion in which both side walls are not winding, where the first portion and second portion are alternatively placed in a radial direction of the disk.

16. A reproducing method of an optical disk having a substrate and a recording layer formed on the substrate, wherein the substrate includes a tracking guide constituted by one of the groove and a land, where the tracking guide includes a first portion in which both side walls of the tracking guide are allowed to wind in accordance with address information, a second portion in which both side walls are not winding, the first portion and second portion being alternatively placed in a radial direction of the disk, and a absolute-address recognition section provided at a region between two tracking guides that are adjacent to each other in the disk radial direction, wherein the reproducing method comprises the step of:

reproducing the address information based on a signal from the absolute-address recognition section and a signal from the first portion.

17. A reproducing method of an optical disk that has a tracking guide constituted by one of a groove and a land, the tracking guide having a first portion in which both side walls of the tracking guide are allowed to wind in accordance with address information and a second portion in which both side walls of the tracking guide are not winding, the first portion and the second portion being alternatively placed in a radial direction of the disk, wherein the reproducing method comprises the step of:

applying a reproducing-use light spot onto the optical disk, the reproducing-use light beam spot being applied having a diameter that is greater than the track pitch and smaller than double the track pitch.

* * * * *